United States Patent [19]

Haux et al.

[11] 4,269,376

[45] May 26, 1981

[54] APPARATUS FOR CONTROLLING EXPLOSIVE DECOMPRESSIONS IN AN AIRCRAFT OR SPACESHIP

[75] Inventors: Ulrich Haux, Baldham; Werner Voigt, Weilheim, both of Fed. Rep. of Germany

[73] Assignee: Messerschmitt-Boeikow-Blohm Gesellschaft mit beschraenkter Haftung, Munich, Fed. Rep. of Germany

[21] Appl. No.: 966,207

[22] Filed: Dec. 4, 1978

[30] Foreign Application Priority Data

Dec. 20, 1977 [DE]  Fed. Rep. of Germany ....... 2756726

[51] Int. Cl.³ .............................................. B64C 1/10
[52] U.S. Cl. ................................. 244/117 R; 49/141; 52/1; 98/119; 244/118.5
[58] Field of Search ............... 244/118 R, 118 P, 119, 244/129.1, 117 R, 118.5; 98/119; 49/31, 141; 137/513.3; 52/1, 98

[56] References Cited

U.S. PATENT DOCUMENTS

| | | | |
|---|---|---|---|
| 3,258,890 | 7/1966 | Dirkse | 52/1 X |
| 3,938,764 | 2/1976 | McIntyre et al. | 244/188 P |
| 4,033,247 | 7/1977 | Murphy | 244/119 |
| 4,049,221 | 9/1977 | Fountain | 244/118 R |

FOREIGN PATENT DOCUMENTS

2303149  10/1976  France .................... 244/118 P

OTHER PUBLICATIONS

*Flight International,* "Floor-venting the wide bodies" by John Belson, Dec. 4, 1976, pp. 1644–1651.

*Primary Examiner*—Charles E. Frankfort
*Attorney, Agent, or Firm*—W. G. Fasse; D. F. Gould

[57] ABSTRACT

Explosive decompressions in an aircraft or in a spaceship are controlled in individual rooms or compartments thereof by including in the walls, which separate these rooms or compartments, zones or boundaries of such zones which have an inherent rated or predetermined breaking characteristic whereby these zones or boundaries may break in one or the other direction depending on which compartment the decompression started.

3 Claims, 6 Drawing Figures

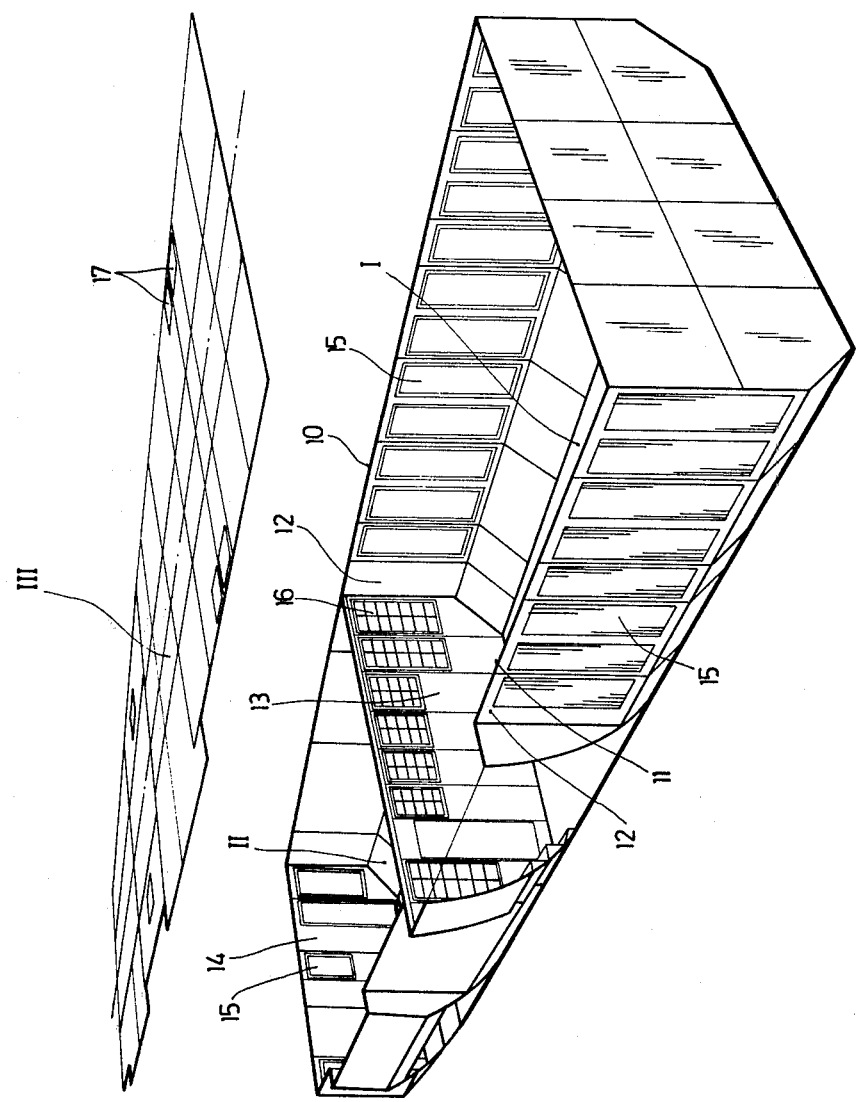

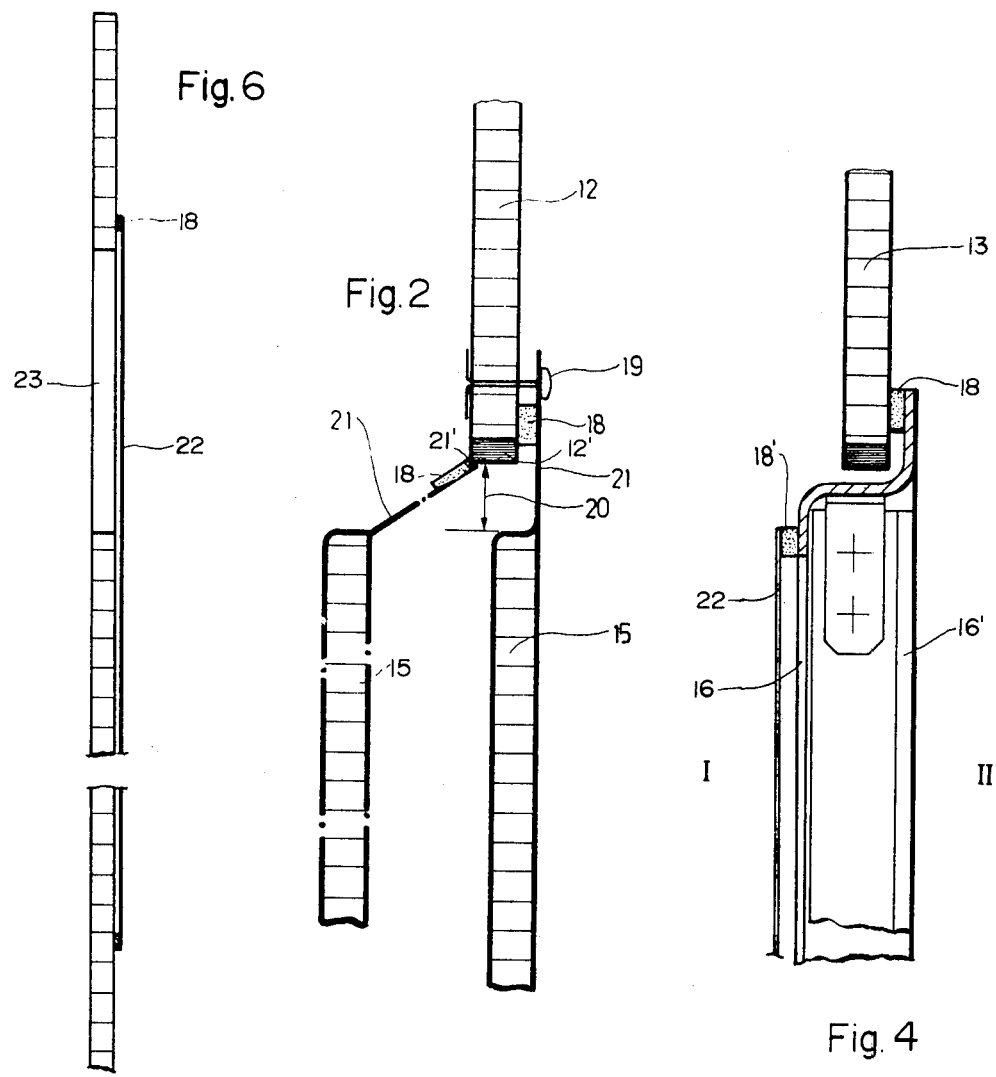

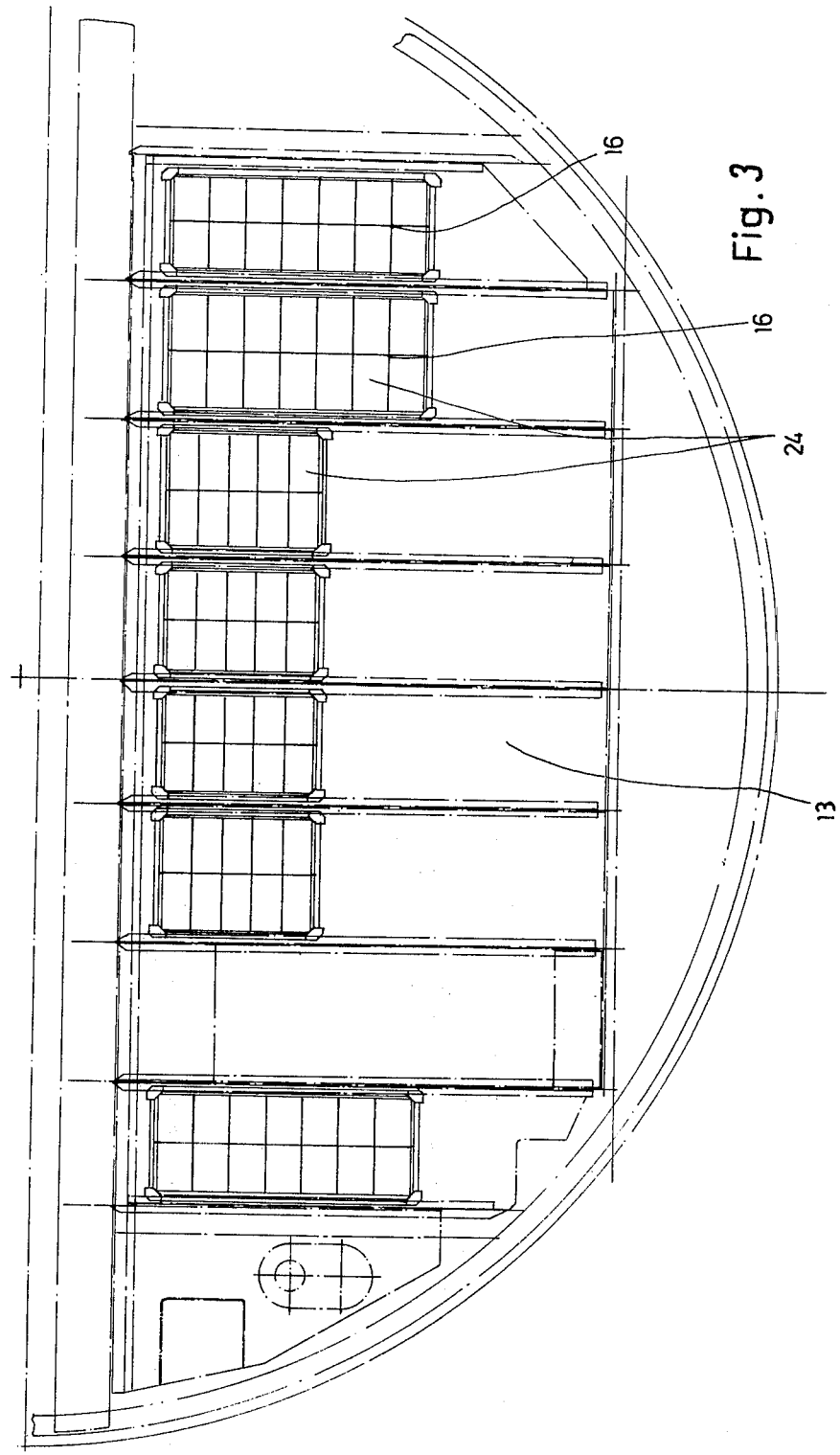

4,269,376

APPARATUS FOR CONTROLLING EXPLOSIVE DECOMPRESSIONS IN AN AIRCRAFT OR SPACESHIP

BACKGROUND OF THE INVENTION

The present invention relates to an apparatus for avoiding the disadvantages with serious consequences in the instance of an explosive decompression in compartments within aircraft and space vehicles.

An explosive decompression means a sudden pressure decrease within a closed volume or compartment under pressure as a result of an opening to the surrounding environment. Such sudden pressure drops may occur in aircraft and space vehicles as a result of damage to the pressurized fuselage structure or skin, fatigue of the fuselage structure, meteorite impact, or due to the loss of doors and/or windows. In a well known instance, for example, a door to the luggage compartment became unlocked during flight. The pressure in the luggage compartment dropped off drastically. There were no features whatsoever provided in said aircraft for handling such a situation to produce a continuous pressure equalization between the passenger compartment and the luggage compartment. Hence, practically the total pressure differential relative to the surrounding environment, was loading the floor of the passenger compartment. The sudden pressure loading of the passenger compartment floor led to the collapse of the passenger compartment floor and to a jamming of the entire steering elements which were arranged and supported within the passenger floor, which caused the crash of the aircraft.

OBJECTS OF THE INVENTION

In view of the above it is the aim of the invention to achieve the following objects singly or in combination:

to provide an arrangement which avoids the above mentioned disadvantages in the instances of an explosive decompression;

to construct the compartment separating walls in a space or aircraft or any compartment that may be subject to decompression, in such a manner that, in response to decompression, the walls and ceilings, will break in a controlled, predetermined manner; and to substantially reduce localized pressure peaks that may otherwise occur as a result of any decompression.

SUMMARY OF THE INVENTION

According to the invention there are provided rated break zones within the walls and ceilings, between individual compartments of a structure that may be subject to decompression. These break zones may open in either direction in response to pressure overloading.

Considering the special configuration and construction of an aircraft, it may be useful, if the rated break zones are determined or determinable for individual limit values of pressure overloading on either side of the wall, floor, or ceiling. For this purpose, the present invention suggests, for example, that in order to open the pressure equalization zone or rated breaking zone in one direction, a completely defined foam material break is arranged on one side of the wall, and for opening in the other direction a preimpregnated rim is provided.

A calculating method has been developed for determining the areal or surface size of the break limit region or zone and for ascertaining the opening pressure inwardly as well as outwardly. The calculating method has been calibrated with the aid of tests simulating mechanical flow conditions similar to those of a decompression. This method makes an optimization of the additionally required opening areas possible while simultaneously using existing opening areas. Marginal conditions for the opening pressures may also be taken into account. Such marginal conditions may be predetermined by the cargo load, for example. A considerable lessening of the local pressure peaks, especially in the area of the fuselage opening causing the decompression may be attained if the opening areas have been dimensioned by the calculating method which takes into account the different opening pressures inwardly and outwardly and by means of the special construction of the opening areas.

BRIEF FIGURE DESCRIPTION

In order that the invention may be clearly understood, it will now be described, by way of example, with reference to the accompanying drawings, wherein:

FIG. 1 illustrates a perspective view of an aircraft cargo compartment structure;

FIG. 2 shows a cross section through one example embodiment of a rated break structure;

FIG. 3 illustrates a view of a cargo compartment wall, wherein the rated break zones are arranged in a grid pattern;

FIG. 4 shows a partial view of the frame of the rated break zones (blow out panel)

FIG. 6 shows a section through the arrangement according to FIG. 5.

Figure 5:
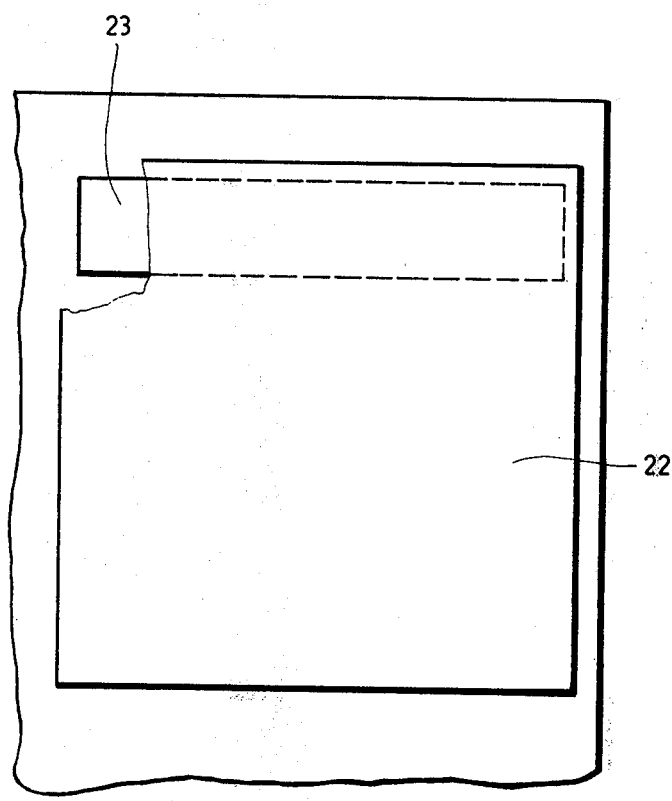
FIG. 5 shows a top view of an arrangement of the rated break regions in the cargo compartment ceiling.

DETAILED DESCRIPTION OF PREFERRED EXAMPLE EMBODIMENTS ILLUSTRATING THE BEST MODES OF THE PRESENT INVENTION

FIG. 1 shows the construction of the cargo compartments I, II within the fuselage structure of a large capacity aircraft. Tests have shown that each type of wall, that is sidewalls, so-called bulkhead walls or compartment separating walls, ceilings, etc., are subjected to certain pressures which are different from one another, in the instance of an explosive decompression. To reduce the high differential pressure between the individual compartments within the aircraft fuselage or to attain a safe, even pressure equalization, the individual partition walls must have different predetermined rated break zones. An additional factor requires attention, namely, that the type and the positioning of the freight, whether or not the aircraft is loaded, play an influencial role. The individually occurring maximum pressures may be determined by calculation, whereby the volume of each compartment, each pressure existing therein, and the existing temperature form the initial values. The connections between the compartments are defined by the area of the open cross-section and the additional area is defined together with the pressure differential, at which the additional area shall open.

Mass flow balances are formed in or for each volume unit after the computation of the mass flows in all volume unit connecting openings at the time "t" and the relationship of the change of pressure in the individual compartments is formed as a function of the mass flow and with the aid of the adiabatic equations and the gas equations. This calculating method is calibrated with the aid of the discharge coefficients. The mass flow is determined as a function of the pressure ratio or condition with the help, for example, of the Jobson equations.

In the instance of decompression, the rated value break zones of the vertical side panels 10, 11 must open at a determined maximum pressure in the direction of the cargo compartment I or II, or the panels must open outwardly from the respective cargo compartment. That is, the rated value breaking region or zone opens a particular surface size to enable a pressure equalization. In this instance, the maximum pressure for opening in the outward direction is a value higher than the maximum pressure for opening inwardly.

Due to the requirement that the cargo compartment is to be dimensioned also for non-approved containers, that is, if necessary, the cargo compartment walls must be able to take-up higher inner pressures, which may even be higher than the decompression load, it is possible to achieve a pressure equilization without danger by using the calculation method for optimizing the cooperation of the individual rated break zones while taking the total load into account.

The individual wall or covering panels 12, 13, 14 which are to take up the rated break surfaces or zones 15, 16, 17 are cut out in accordance with the calculated through flow opening area. The rated value break zones 15 provided with a double sided foam adhesive strip 18, are inserted into the panels from within and secured by clamps 19.

In the instance of the vertical, lateral cargo compartment walls 10, 11, the process according to the invention operates as follows, referring to FIG. 2. With increasing pressure on the outside, the left side of the panel plates 12 in FIG. 2 and with the resulting surface load on the rated value break zones 15, the foam material layer 18 of the double faced adhesive strip is torn and the plate or panel 15 moves inwardly, to the right in FIG. 2.

In the instance of pressure increase inside the cargo compartment or in the opposite direction, the break zone 15 with the preimpregnated border is pressed against the frame 12' when the determined surface pressure has been reached. In this instance the rim 21 buckles across a defined gap 20 between the frame 12' and the plate or panel 15, whereby the latter moves outwardly, to the left, as shown in dash-dotted lines in FIG. 2 whereby the rim 21 will tear at 21'.

The conditions at the separating wall 13 of the cargo compartment differ somewhat from the above situation. In this instance, flow through openings must be provided, which open in one or the other of the two possible directions in response to the same pressure of a certain size and effective in one or the other direction. For this purpose, the invention provides that these flow through openings are arranged in grid type fashion. Consideration must be given to the fact, the grids 16 in the through flow openings 24 must take up the cargo load, which usually differs from compartment to compartment.

As shown in FIG. 3, the panels 13 in this example embodiment, are cut out and light metal grids 16, for example, are inserted into the cut outs from both sides. These grids are sealed on the rear side by panels 22 held in place by double sided foam adhesive strips 18' as shown in FIG. 4. The light metal grids 16 themselves are also held in the wall panels 13 by double sided foam adhesive strip 18 which is sticky on two opposite sides.

If the pressure increases in the cargo compartment I, the back side of the grid 16 which is sealed by the panel 22 is pressure loaded. The panel 22 breaks away from the grid 16 and the strip 18' and moves toward the grid 16' on the opposite side of the separation wall which faces the cargo compartment II. The pressure load causes the adhesive strip 18 to break away and the flow passage surface is opened.

The same sequence of events occurs in the instance of a reverse loading situation, that is, when the pressure originates from the cargo compartment II.

When the through-flow passages are arranged in the ceiling III, the following sequence of events occurs.

If a decompression takes place in any cargo compartment, an outflow of air in the passenger compartment occurs, whereby the unaffected cargo compartment is a closed volume under excess gauge pressure relative to the passenger compartment.

In order to reduce such excess pressure, a certain number of through-flow openings 17 acting as valves are arranged in the ceiling III of the individual cargo compartments as shown in FIG. 1. These through-flow openings 17 are covered from above with panels 22 held in place by a double sided foam adhesive strip 18 as shown in FIGS. 5 and 6, whereby each cover sheet 22 is larger than the back flow openings 23 as best seen in FIG. 5, whereby it is possible to match the bonding strength of the adhesive strip 18 to the desired opening pressure. When the pressure drops in any passenger compartment, a respective relative pressure increase results in the cargo compartments I, II, whereby the covering panels 22 of the back flow openings 23 are additionally loaded due to the pressure differential. Hence, these covering panels 22 break free from the adhesive strip 18 when a predetermined pressure is reached and release the back flow opening 23.

Although the invention has been described with reference to specific example embodiments, it is to be understood, that it is intended to cover all modifications and equivalents within the scope of the appended claims.

What is claimed is:

1. A device for minimizing damages caused by an explosive decompression in any compartment of a group of contiguous compartments, comprising wall means separating adjacent compartments from each other, holes in said wall means, panel means operatively arranged to cover said holes, first break means (18) operatively inserted between said panel means and said wall means, said first break means (18) being arranged to respond to a first pressure differential effective in one direction across said wall means, second break means (21) operatively connecting said panel means to said wall means, said second break means (21) being arranged to respond to a second pressure differential effective across said wall means in the direction opposite to said one direction, whereby a substantially continuous pressure equalization is possible in both directions and in response to different individual limit loads effective in said two directions, and wherein said first break means (18) comprise a strip of foam material surrounding said holes in said wall means, and wherein said second break means (21) comprise a rim (21) of preimpregnated material.

2. The device of claim 1, further comprising grid means arranged to mechanically reinforce said panel means to take up mechanical loads which may occur in addition to said pressure differential.

3. The device of claim 1, wherein said panel means have a dimension relative to the respective hole such that a gap (20) is formed between the panel means and the wall means, said second break means (21) being capable of buckling across said gap (20) in response to said second pressure differential.

* * * * *